(12) United States Patent
Cao et al.

(10) Patent No.: US 11,588,728 B2
(45) Date of Patent: Feb. 21, 2023

(54) TREE STRUCTURE-BASED SMART INTER-COMPUTING ROUTING MODEL

(71) Applicant: Airbnb, Inc., San Francisco, CA (US)

(72) Inventors: Yuanpei Cao, San Francisco, CA (US); Yu Guo, San Francisco, CA (US); William Andrew Betz, San Francisco, CA (US); Reid Marlow Andersen, San Francisco, CA (US)

(73) Assignee: Airbnb, Inc., San Francisco, CA (US)

( * ) Notice: Subject to any disclaimer, the term of this patent is extended or adjusted under 35 U.S.C. 154(b) by 873 days.

(21) Appl. No.: 16/218,057

(22) Filed: Dec. 12, 2018

(65) Prior Publication Data
US 2020/0195550 A1 Jun. 18, 2020

(51) Int. Cl.
| | |
|---|---|
| *H04L 45/48* | (2022.01) |
| *G06F 16/2458* | (2019.01) |
| *G06F 16/2457* | (2019.01) |
| *G06F 11/07* | (2006.01) |
| *H04L 45/00* | (2022.01) |
| *H04L 45/02* | (2022.01) |

(52) U.S. Cl.
CPC .......... *H04L 45/48* (2013.01); *G06F 11/0754* (2013.01); *G06F 16/2477* (2019.01); *G06F 16/24578* (2019.01); *H04L 45/02* (2013.01); *H04L 45/14* (2013.01); *H04L 45/22* (2013.01); *G06F 2201/81* (2013.01)

(58) Field of Classification Search
CPC .................. G06F 16/2477; G06F 16/24578
See application file for complete search history.

(56) References Cited

U.S. PATENT DOCUMENTS

| | | | |
|---|---|---|---|
| 5,864,679 A | 1/1999 | Tatsunori et al. | |
| 8,620,790 B2 | 12/2013 | Priebatsch | |
| 9,665,327 B1* | 5/2017 | Yokoohji | G06F 3/1273 |
| 2007/0233603 A1 | 10/2007 | Schmidgall et al. | |
| 2010/0131953 A1* | 5/2010 | Dice | G06F 9/466 |
| | | | 711/E12.001 |
| 2015/0113164 A1* | 4/2015 | Butler | H04L 45/22 |
| | | | 709/239 |
| 2016/0204990 A1* | 7/2016 | Shattil | H04L 67/101 |
| | | | 370/252 |

OTHER PUBLICATIONS

PCT International Search Report and Written Opinion, International Patent Application No. PCT/US2019/053683, dated Dec. 5, 2019, 14 pages.

* cited by examiner

*Primary Examiner* — Kannan Shanmugasundaram
(74) *Attorney, Agent, or Firm* — Schwegman Lundberg & Woessner, P.A.

(57) ABSTRACT

Systems and methods are disclosed for retrieving, from a database, over a network, historical routing data for multiple attributes and determining, for each attribute, based on its respective historical routing data, whether processing volume and processing error rates for each attribute exceed respective threshold. If both processing volume and error rate exceed their respective thresholds, the systems and methods describe herein calculate, for each qualifying attribute, a degree to which routing for each attribute can be improved. The systems and methods described herein output a ranking for each qualifying attribute based on their respective degrees to which routing can be improved for the respective attributes.

18 Claims, 6 Drawing Sheets

TREE STRUCTURE-BASED SMART INTER-COMPUTING ROUTING MODEL

TECHNICAL FIELD

The disclosure generally relates to the field of optimizing routing decisions between computing systems. More specifically, some embodiments disclosed herein are directed to determining historical sub-optimal routing occurrences, and prioritizing future routing procedures to optimize future routing decisions.

BACKGROUND

Related art systems define a routing scheme by ingesting parameters, such as geography, network type, transaction type, and the like to select a transaction processor. Problematically, these systems are static in nature, and do not factor in historical routing failures. Moreover, these related art systems attempt to optimize routing schemes in all instances, thus resulting in wasted processing power where there is not sufficiently enough of a gain to be made through optimization to justify the processing cost. Yet further, these related art systems consider macro parameters, without considering more granular attributes of transactions to be routed.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
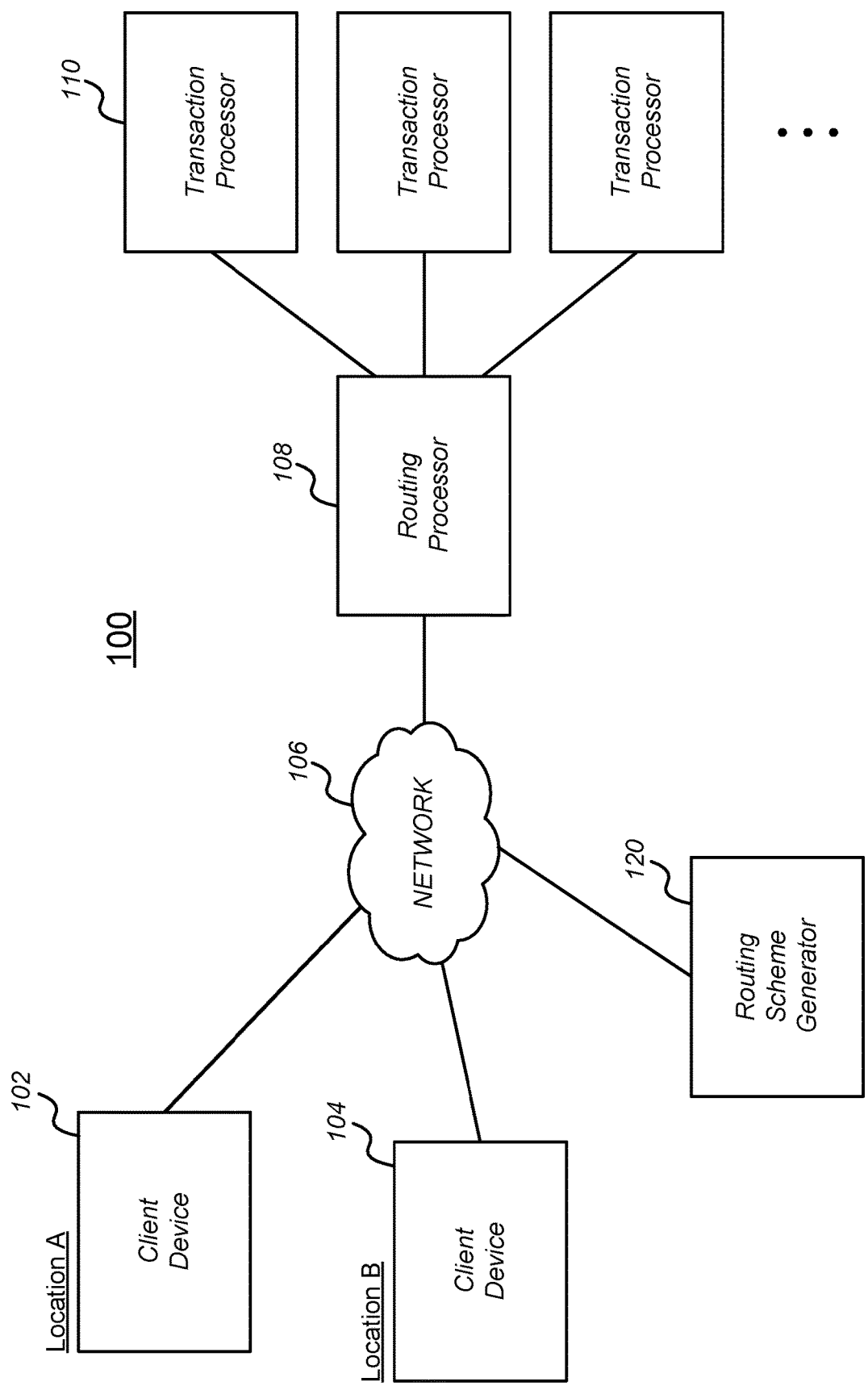
FIG. 1 illustrates one embodiment of a system for processing and optimally routing transactions, in accordance with some embodiments of the disclosure.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium includes analyzing historical routing data for how a router processes given attributes to determine whether routing for that attribute could be optimized, e.g., by handling ongoing transactions using a different router. In this manner, routing optimization opportunities are identified and implemented in accordance with other constraints. To this end and others, in some aspects of the disclosure, a processor retrieves, from a database, over a network, first historical routing data for a first attribute and second historical routing data for a second attribute. The processor determines, based on the first historical routing data, whether a first processing volume for the first attribute exceeds a first volume threshold, and whether a first processing error rate for the first attribute exceeds a first error threshold. In response to determining that both the first processing volume for the first attribute exceeds the first volume threshold, and the first processing error rate for the first attribute exceeds the first error threshold, the processor determines a first degree to which routing can be improved for the first attribute using alternate routing means.

The processor then goes on to perform a similar analysis for the second attribute by determining, based on the second historical routing data, whether a second processing volume for the second attribute exceeds a second volume threshold, and whether a second processing error rate for the second attribute exceeds a second error threshold. In response to determining that both the second processing volume for the second attribute exceeds the second volume threshold, and the second processing error rate for the second attribute exceeds the second error threshold, the processor calculates a second degree to which routing can be improved for the second attribute. The processor then outputs a ranking for the first attribute and the second attribute based on respective values of the first degree and the second degree. The ranking, in conjunction with other factors (e.g., model constraints, etc., as described below), are used to optimize a routing decision.

System Architecture

FIG. 1 illustrates one embodiment of a system for processing and optimally routing transactions, in accordance with some embodiments of the disclosure. FIG. 1 depicts system 100, which includes client device 102 and client device 104. The manner in which client devices operate is described in further detail with respect to FIG. 2. Client device 102 is at a first location, labeled location A, and client device 104 is at a second location, location B. While the principal example used herein is that locations A and B represent different principalities or countries, any boundary that differentiates laws that apply to locations A and B may define the scope of each of location A and location B.

System 100 also includes network 106, through which client device 102 and client device 104 may communicate with routing processor 108 and routing scheme generator 120. Routing processor 108 routes transactions to transaction processors 110. While only one routing processor 108 is depicted, system 100 may include a plurality of routing processors 108. Routing scheme generator 120 generates routes for transaction processing in accordance with the embodiments disclosed herein.

Computing Machine Architecture

Figure 2:
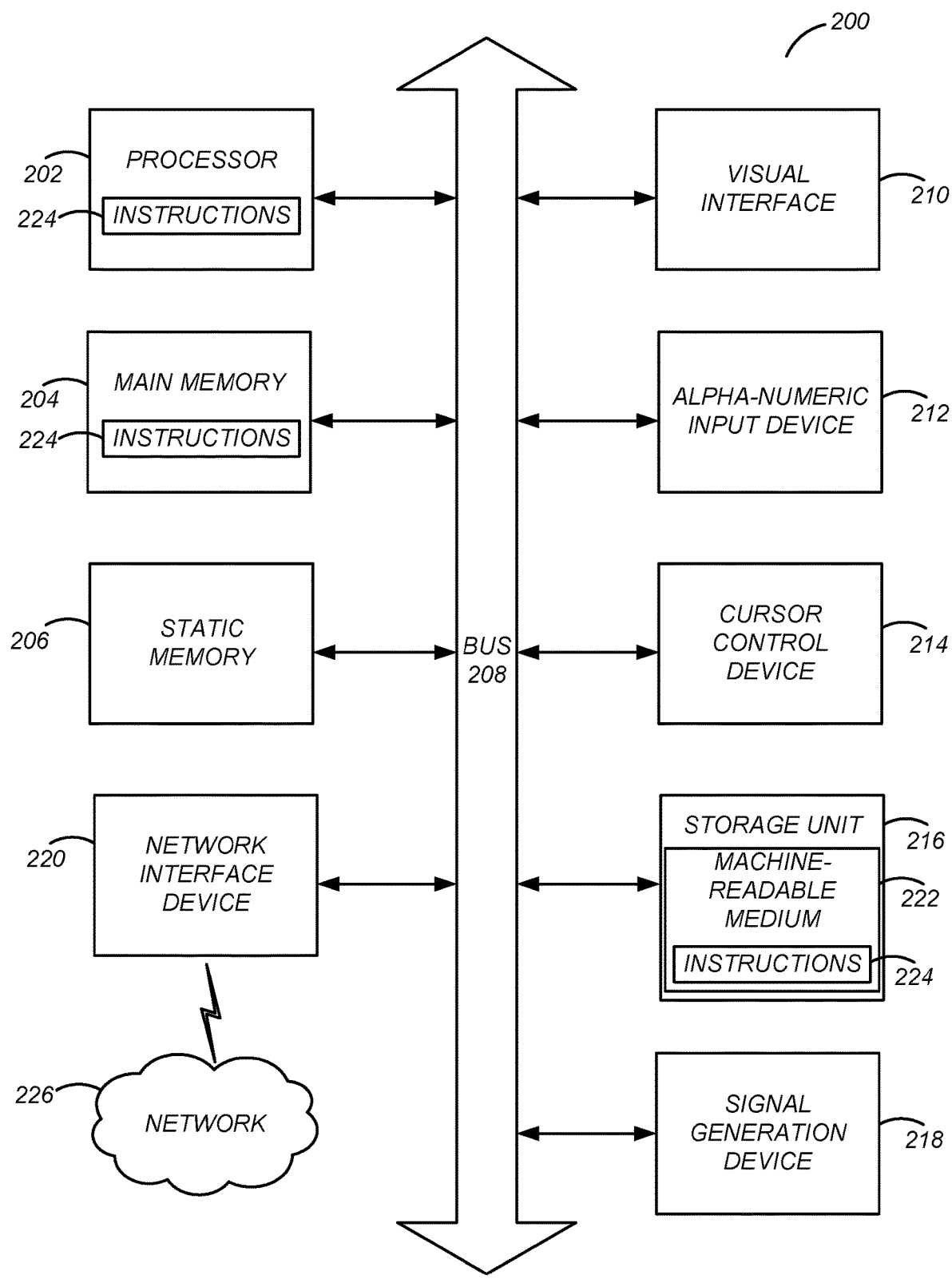
FIG. 2 illustrates one embodiment of a block diagram illustrating components of an example machine able to read instructions from a machine-readable medium and execute them in a processor (or controller), in accordance with some embodiments of the disclosure.

FIG. 2 is a block diagram illustrating components of an example machine able to read instructions from a machine-readable medium and execute them in a processor (or controller). Specifically, FIG. 2 shows a diagrammatic representation of a machine in the example form of a computer system 200 within which program code (e.g., software) for causing the machine to perform any one or more of the methodologies discussed herein may be executed. The program code may be comprised of instructions 224 executable by one or more processors 202. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 224 (sequential or otherwise) that specify actions to be taken by that machine. Further, while only a single machine is illustrated, the term "machine" shall also be taken to include any collection of machines that individually or jointly execute instructions 224 to perform any one or more of the methodologies discussed herein.

The example computer system 200 includes a processor 202 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 204, and a static memory 206, which are configured to communicate with each other via a bus 208. The computer system 200 may further include visual display interface 210. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 210 may include or may interface with a touch enabled screen. The computer system 200 may also include alphanumeric input device 212 (e.g., a keyboard or touch screen keyboard), a cursor control device 214 (e.g., a mouse, a trackball, a joystick, a motion sensor, or other pointing instrument), a storage unit 216, a signal generation device 218 (e.g., a speaker), and a network interface device 220, which also are configured to communicate via the bus 208.

The storage unit 216 includes a machine-readable medium 222 on which is stored instructions 224 (e.g., software) embodying any one or more of the methodologies or functions described herein. The instructions 224 (e.g., software) may also reside, completely or at least partially, within the main memory 204 or within the processor 202 (e.g., within a processor's cache memory) during execution thereof by the computer system 200, the main memory 204 and the processor 202 also constituting machine-readable media. The instructions 224 (e.g., software) may be transmitted or received over a network 226 via the network interface device 220.

While machine-readable medium 222 is shown in an example embodiment to be a single medium, the term "machine-readable medium" should be taken to include a single medium or multiple media (e.g., a centralized or distributed database, or associated caches and servers) able to store instructions (e.g., instructions 224). The term "machine-readable medium" shall also be taken to include any medium that is capable of storing instructions (e.g., instructions 224) for execution by the machine and that cause the machine to perform any one or more of the methodologies disclosed herein. The term "machine-readable medium" includes, but not be limited to, data repositories in the form of solid-state memories, optical media, and magnetic media.

Tree Structure-Based Smart Routing Model

Figure 3:
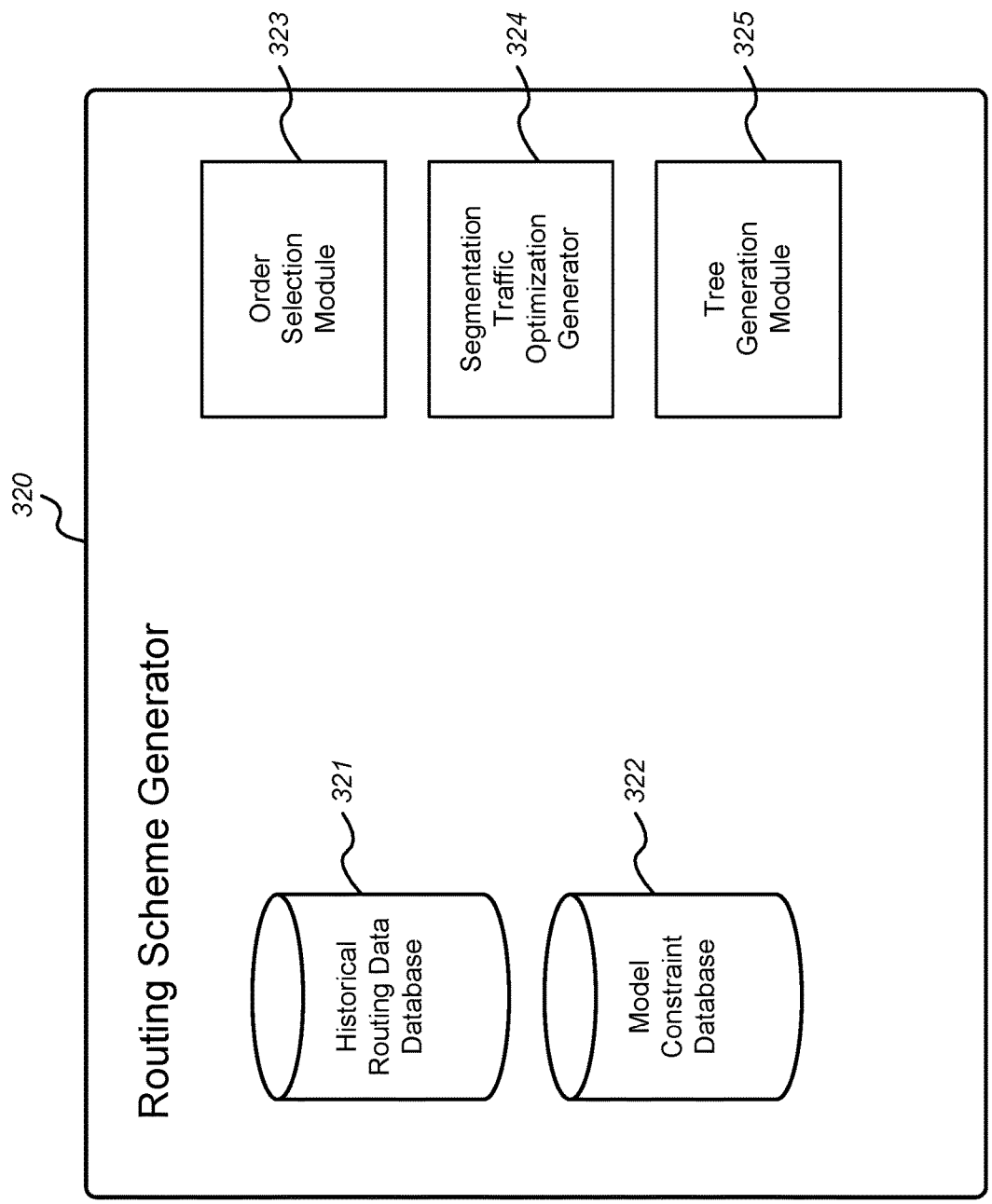
FIG. 3 illustrates one embodiment of a system diagram of a routing scheme generator, including databases and modules utilized by the routing scheme generator, in accordance with some embodiments of the disclosure.

FIG. 3 illustrates one embodiment of a system diagram of a routing scheme generator, including databases and modules utilized by the routing scheme generator, in accordance with some embodiments of the disclosure. FIG. 3 depicts routing scheme generator 320, which corresponds to routing scheme generator 120 of FIG. 1, and which generates and outputs a ranking that is used to drive routing decisions. Routing scheme generator 320 includes some or all of the components depicted in FIG. 2.

A. Ordering the Hierarchy of the Tree-Based Smart Routing Model

Routing scheme generator 320 includes various modules, such as order selection module 323, segmentation traffic optimization generator 324, and tree generation module 325. Routing scheme generator 320 also includes various databases, such as historical routing data database 321, and model constraint database 322, which are referenced by the various modules of routing scheme generator 320 when those modules are executed. While routing scheme generator 320 is depicted as a single system including the various attributes and databases, the logical operations carried out by these modules and the data stored in these databases may be organized and implemented differently, and may be distributed across multiple systems or servers in any combination.

In connection with generating a routing scheme, processor 202 of routing scheme generator 320 builds a tree-based routing structure. Processor 202 determines the hierarchical order of the tree-based routing structure by executing order selection module 323. While order selection module 323 is depicted as a stand-alone module, order selection module 323 may alternatively be a sub-module of tree generation module 325.

Order selection module 323 bases the order of hierarchy of attributes included in the tree-based routing structure on a degree to which historical routing failures could have been improved using alternate routing means for each attribute. To determine this degree, order selection module 323 retrieves, from a database including historical routing data, (e.g., historical routing data database 321), historical routing data for as many attributes as may potentially be included in the tree-based structure. The database may be local to routing scheme generator 320 (e.g., at storage unit 216), or remote to routing scheme generator 320 and accessed over a network (e.g., network 226 or network 106). In a preferred embodiment, the historical routing data for each attribute correspond to a same transaction processor 110, so that the tree-based routing structure reflects a degree to which routing can be improved for each attribute relative to a same transaction processor 110 by using a different transaction processor 110.

As used herein, the term historical routing data refers to data that is descriptive of prior attempts to route transactions. The attributes ordered by order selection module 323 are categories of historical routing data. Examples of these attributes include a geographic area in which routing is attempted (e.g., Location A or Location B), whether a routing attempt is scheduled to recur, a token corresponding to the geographic area in which routing is attempted, an identifier of a transaction tool used to effect the routing attempt, a partially masked version of the identifier of the transaction tool, a type of the transaction tool, a normalized amount of tokens used during the routing attempt, and the like. Historical routing data database 321 stores, for each transaction attempt, data reflecting attributes of the transaction attempt. While only one historical data database 321 is depicted in FIG. 3, multiple historical routing data databases 321 may be in place, each corresponding to attempts by a different transaction processor 110.

Having retrieved the historical routing data for each attribute, order selection module 323 goes on to determine, based on the historical routing data for each attribute, whether a processing volume for each attribute exceeds a respective volume threshold. The volume threshold may be unique to each attribute, such that each attribute has a different volume threshold. Order selection module 323 performs this determination to ensure, as will be described in further detail below, that further resources are dedicated to scenarios where there is sufficient volume to justify determining whether gains made by routing transactions having a given attribute using alternate means are sufficiently large. As used herein, the term processing volume refers to an amount of attempts to perform a transaction having a given attribute. The processing volume may be time-based, and may thus reflect an amount of attempted transactions within a given period of time from a reference point (e.g., a present time), and may also thus reflect a frequency of transaction attempts having the given attribute within a given period of time. The volume threshold may be a default value, may be set by an operator, or may be dynamically computed. Order selection module 323 may dynamically compute the volume threshold by determining an amount of transaction attempts for each attribute known to order selection module 323. This may be for one transaction processor 110, or for a number of transaction processors 110. Order selection module 323 may confine the determination of the amount to a given period of time. Order selection module 323 may perform a statistical analysis on the amounts for each attribute, and may determine the threshold based on, e.g., an average, mean, median, standard deviation analysis, and the like. For example, processor 202 may determine that the volume threshold for all attributes, and/or for a given attribute, be a particular percentile, such as twentieth percentile, of volumes for each transaction processor 110.

Order selection module 323 also determines whether a processing error rate for each attribute exceeds a respective error threshold. The error threshold may be constant, or may differ for each respective attribute. As used herein, the term processing error rate is used to refer to a difference in a percentage of failed attempts by a transaction processor (e.g., with respect to a given attribute) to process or route a transaction relative to that of another transaction processor. For example, if transaction processor A has historically had a 95% success rate with respect to an attribute, and transaction processor B has historically had a 99% success rate with respect to the same attribute, the processing error rate would be determined to be 4% for transaction processor A.

If the error threshold is 2%, then the processing error rate would exceed the error threshold (because the difference in success rates is 4%, which exceeds 2%). In some embodiments, several processing error rates may be calculated for a single transaction processor (e.g., in a scenario where success rates of further transaction processors, such as transaction processor C, transaction processor D, etc., are known and available to be compared to the success rate of transaction processor A). Each of, or any of, these several processing error rates may be compared against the error threshold to determine whether the error rate of transaction processor A with respect to a given attribute exceeds the error threshold for that given attribute.

Order selection module 323 performs this determination to ensure, as will be described in further detail below, that further resources are dedicated to scenarios where there is a sufficiently high difference in error rates to justify determining whether gains made by routing transactions having a given attribute using alternate means are sufficiently large. In scenarios where the volume threshold for a given attribute has not been reached, order selection module 323 may avoid determining a processing error rate for the given attribute, given that the attribute will not be added to the tree for the above-mentioned reasons. Furthermore, order selection module 323 may determine whether the processing error threshold is met for a given attribute prior to determining whether the volume threshold is met for that attribute, and for the same reason, if the threshold is not met, refrain from determining whether the volume threshold is met.

In scenarios where both the processing volume for a given attribute and where the processing error rate for the given attribute are sufficiently large, order selection module 323 determines whether the error rate can be improved for such a high volume attribute (e.g., by using a different transaction processor 110). Thus, order selection module 323, in response to determining that, for a given attribute, both the processing volume exceeds the volume threshold, and the processing error rate exceeds the error threshold, calculates a degree to which routing can be improved for the given attribute using alternate routing means.

In some embodiments, order selection module 323 calculates the degree to which routing can be improved for a given attribute using alternate routing means by determining a second transaction processor 110 different from the first routing processor that is configured to route data having the given attribute. For example, order selection module 323 of routing scheme generator 320 determines a different transaction processor 110 that has memory with instructions encoded thereon to route the same transaction. Order selection module 323 then goes on to calculate the degree to which routing can be improved based on historical routing data corresponding to the different transaction processor 110. For example, order selection module 323 determines, for the different transaction processor 110, the error rate of the different transaction processor 110 for processing transactions with the same given attribute. Order selection module 323 then executes a comparison operation between the error rate for the first transaction processor 110 and the different transaction processor 110 to determine whether, and by how much, the performance of the different transaction processor 110 exceeds the first transaction processor 110 when processing transactions having the given attribute. This comparison may be performed between the first transaction processor 110 and any number of additional transaction processors for which there is historical data for processing transactions having the given attribute. This is performed for each given attribute that has a volume exceeding its respective volume threshold and an error rate exceeding its respective error threshold. In some embodiments, this comparison may have already been performed when calculating the error rate for comparison against the error threshold, in which case order selection module 323 may refrain from re-performing this comparison. In other embodiments, while the error threshold may have been exceeded by the error rate as described above, order selection module 323 may perform this comparison for other transaction processors not considered for a comparison of historical data against the error threshold (e.g., because when the threshold is exceeded for one transaction processor's relative success or error rate, this is sufficient for order selection module 323 to execute regardless of whether the threshold is exceeded for other transaction processors' relative success or error rates). As used herein, where error rates are subject to determination and comparison, the disclosure equally applies to retrieval of, and comparison of, success rates.

Order selection module 323 generates (and then outputs to tree generation module 325) a ranking for each given attribute analyzed as discussed above based on the respective degrees to which routing can be improved by using alternate routing means. Tree generation module 325 then generates a tree-based routing structure based on the ranking, which will be discussed below with reference to FIG. 4.

B. Generating the Tree-Based Routing Structure

Figure 4:
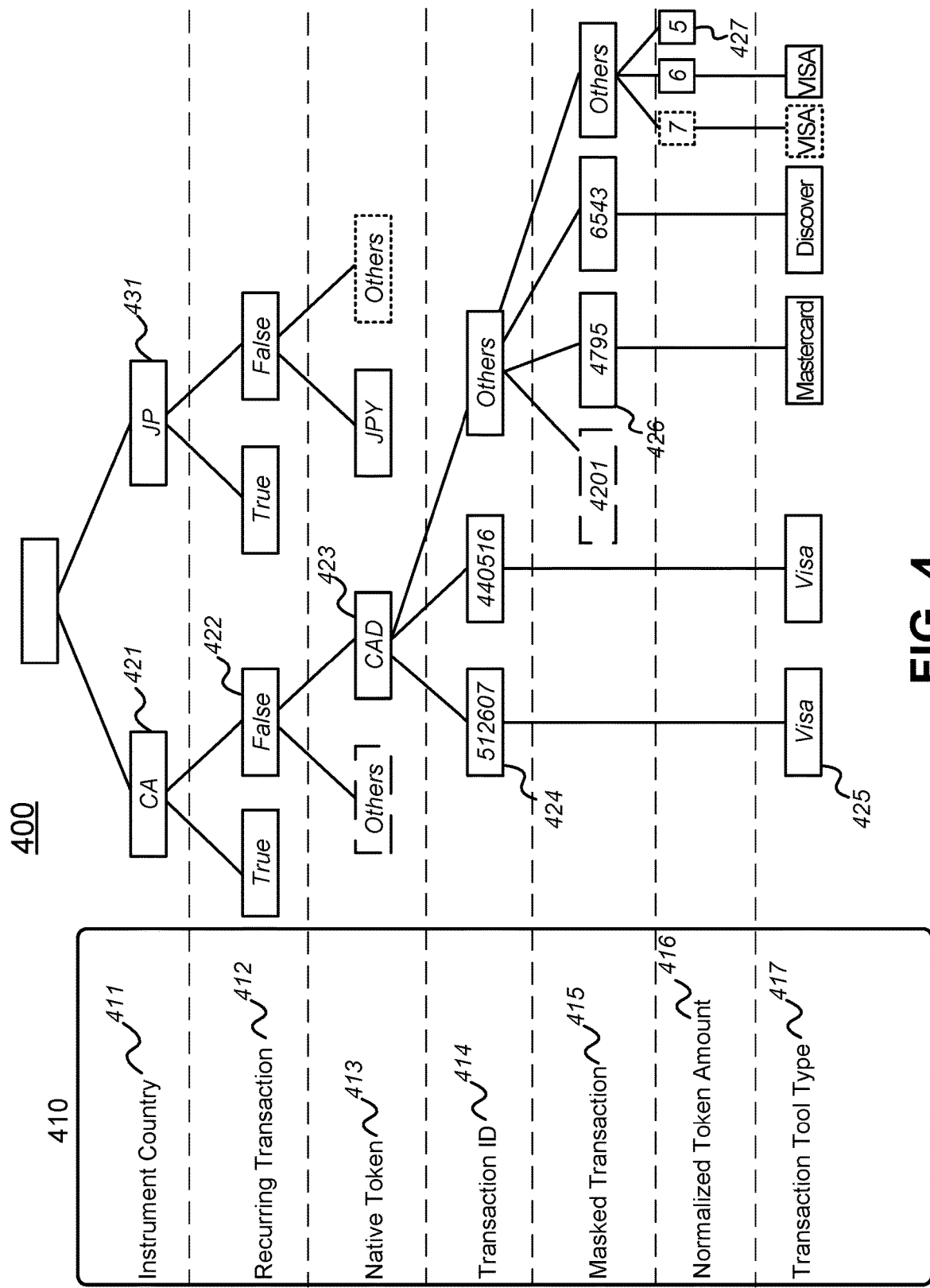
FIG. 4 illustrates one embodiment of a generated routing scheme, in accordance with some embodiments of the disclosure.

FIG. 4 illustrates one embodiment of a generated routing scheme, in accordance with some embodiments of the disclosure. Tree structure 400 includes attributes 410. Tree generation module 325 ranks attributes 410 based on the ranking received from order selection module 323. Instrument country 411 is an attribute of attributes 410 that describes a geographical area from which a transaction originated. Recurring transaction 412 is an attribute of attributes 410 that describes whether a transaction is a one-time transaction, or whether the transaction is set to recur periodically or at a predefined time. Native token 413 is an attribute of attributes 410 that describe a native type of token used in effecting a transaction.

Transaction identifier (ID) 414 is an attribute of attributes 410 that describes an identifier, such as a unique string of characters, which correspond to a transaction tool. Masked transaction identifier 415 is an attribute of attributes 410 that describes a masked version of a transaction identifier, such as the first or last four characters of a transaction identifier. Normalized token amount 416 is an attribute of attributes 410 that describes an amount of tokens, normalized to a value of a reference token (e.g., by way of statistical operations such as logarithmic operations), used in a transaction. Transaction tool type 417 is an attribute of attributes 410 that describes a type of transaction tool used in a transaction. For example, if a transaction tool is a credit card, then the transaction tool type 417 of that transaction may be a brand of card. Attributes 410 are merely illustrative, and FIG. 4 does not depict an exhaustive list of attributes that may be included in attributes 410. For example, attributes 410 may include additional, or different attributes, such as an issuing entity of a transaction (e.g., an issuing bank), whether a transaction is local or crosses borders, various additional attributes of a transaction tool (e.g., whether a transaction tool is a credit or debit card, whether a transaction tool is a commercial or consumer/individual tool, whether a transaction tool is Durbin regulated or not, whether a transaction tool is on file with routing scheme generator 120, and the like).

Tree generation module 325 plots, hierarchically, values for each attribute that are found in the historical routing data. For example, as depicted in FIG. 4, some historical routing data originated in Canada, and thus the value for the attribute instrument country 411 is "CA," which is an abbreviation for Canada. A non-exhaustive illustration of other values can be seen in each node of tree structure 400, each of which are self-explanatory, but for clarity, some further examples are provided. As another example, true/false values are populated (e.g., as is shown in 422) as to whether a payment is recurring for recurring transaction attribute 412, native tokens 423 of Canadian Dollars ("CAD") and Japanese Yen ("JPY") are populated as values for a type of native token 413 found in the historical routing data. Further, transaction identifiers 424 (e.g., reflecting a credit card number, or a Bank Identification Number ("BIN") number (e.g., the first six digits of a credit card number)), masked transaction identifiers 426, such as the first four digits of a BIN number, normalized token amounts 427, and transaction tool types 425, each have values populated as illustrated in FIG. 4. Note that, as tree generation module 325 generates tree structure 400 using historical routing data, if historical routing data does not reflect data at a certain level, then such data is omitted from tree structure 400, as is illustrated in FIG. 4.

Having generated tree structure 400, tree generation module 325 determines a best transaction processor 110 to process a transaction having a given set of attributes (as shown in FIG. 4). For example, processor 202 may determine that some branches will be optimally processed by a first transaction processor, and that other branches will be optimally processed by a second transaction processor. FIG. 4 illustrates transactions best processed by the first transaction processor using solid lines, and transactions best processed by the second transaction processor using dashed lines. In cases where there is no difference, or optionally, marginal difference, in whether a transaction is best processed by one transaction processor or the other, this fact may be flagged as well; such transactions are illustrated using dotted lines in FIG. 4. Tree generation module 325 may generate and store to memory a data structure that indicates sets of attribute values that will be optimally processed by a given transaction processor.

In some embodiments, in order to ensure that tree generation module 325 is accurately generating a most optimal tree structure for routing transactions, historical routing data database 321 is updated as processor 202 processes new transactions with data corresponding to those respective transactions. Periodically, or after a predetermined period of time from when tree structure 400 is generated, processor 202 regenerates ranking 410 based on updated degrees to which routing can be improved by using an alternate processor for each of attributes 410. The regeneration is performed using the same processes described above, but with updated historical routing data for each attribute.

There are scenarios where generating tree structure 400 solely based on attributes 410 will result in suboptimal processing if processing is based on tree structure 400. For example, instrument country 411 for a given branch of tree structure 400 may be Europe, and, examining all data from Europe might result in a first transaction processor appearing to be optimal for processing data with an instrument country 411 of Europe. However, Europe has many countries within it, and it may be the case that a majority of those countries being instrument country 411 may have transactions originating from those countries that are better processed by a second transaction processor. Such an anomaly is referred to as Simpson's Paradox. Thus, in some embodiments, when generating a ranking to feed to tree generation module 325 for generating tree structure 400, order selection module 323 determines whether a given attribute includes a plurality of sub-attributes (e.g., an instrument country 411 that includes smaller countries, principalities, or states, like Europe). In response to determining that the attribute comprises a plurality of sub-attributes, order selection module 323 retrieves additional respective historical routing data for each respective sub-attribute of the plurality of sub-attributes in the manner described above (e.g., from historical routing data database 321). Order selection module 323 then determines a respective additional degree to which routing can be improved for each respective sub-attribute and incorporates this into the ranking fed to tree generation module 325. When generating tree structure 400, tree generation module 325 includes each respective sub-attribute in the ranking based on each respective additional degree.

There are other scenarios beyond the Simpson's Paradox scenario described above where sub-attributes may be added to tree structure 400. For example, when newly obtained historical routing data shows a sufficient difference in failure rates among processors for a given sub-attribute, and there is sufficient volume of transactions using that sub-attribute, it will be added to tree structure 400.

Figure 5:
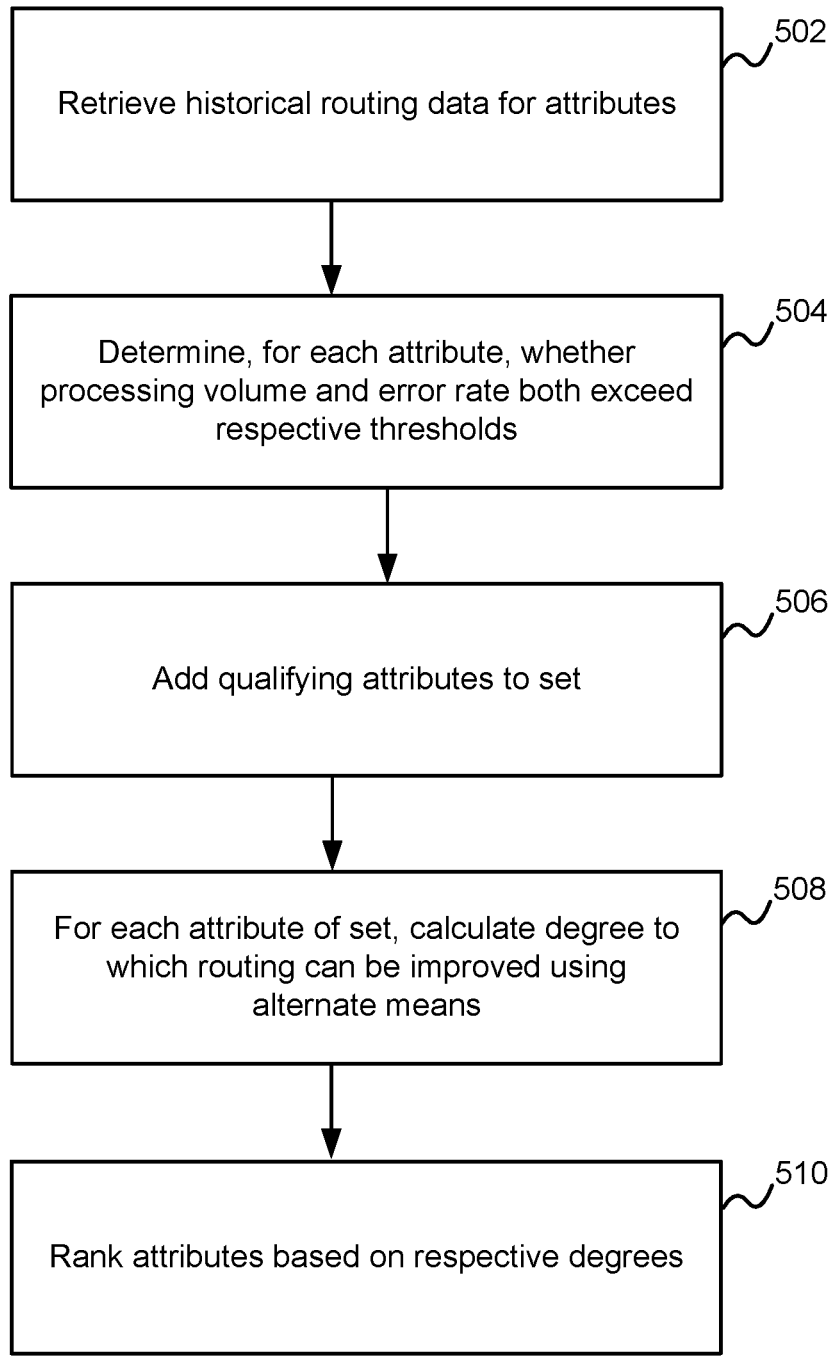
FIG. 5 illustrates one embodiment of a data flow for generating a tree structure, in accordance with some embodiments of the disclosure.

FIG. 5 illustrates one embodiment of a data flow for generating a tree structure, in accordance with some embodiments of the disclosure. The description of process 500 borrows elements described above with respect to FIGS. 3 and 4. For brevity, a detailed description of these elements will be omitted when describing process 500, and the description above with reference to FIGS. 3 and 4 carries to each such element named with respect to FIG. 5. Process 500 with processor 202 of routing scheme generator 320 executing order selection module 323, and order selection module 323 retrieving 502 historical routing data for various attributes that will be used as guideposts for routing future transactions. The historical routing data may be retrieved from historical routing data database 321.

Order selection module 323 then determines 504, for each attribute, whether a respective processing volume and error rate have each exceeded respective thresholds. Each such attribute that exceeds both thresholds based on the historical routing data is considered to be a qualifying attribute, and order selection module 323 adds each qualifying attribute to a set of attributes that are to be ranked. Order selection module 323 then calculates 508, for each attribute of the set, a degree to which routing can be improved using alternate means. Order selection module 323 then ranks 510 the attributes based on respective degrees. The ranking is reflected as depicted in the ordering of attributes 410 of FIG. 4.

C. Constraint-Based Optimal Route Determination

Figure 6:
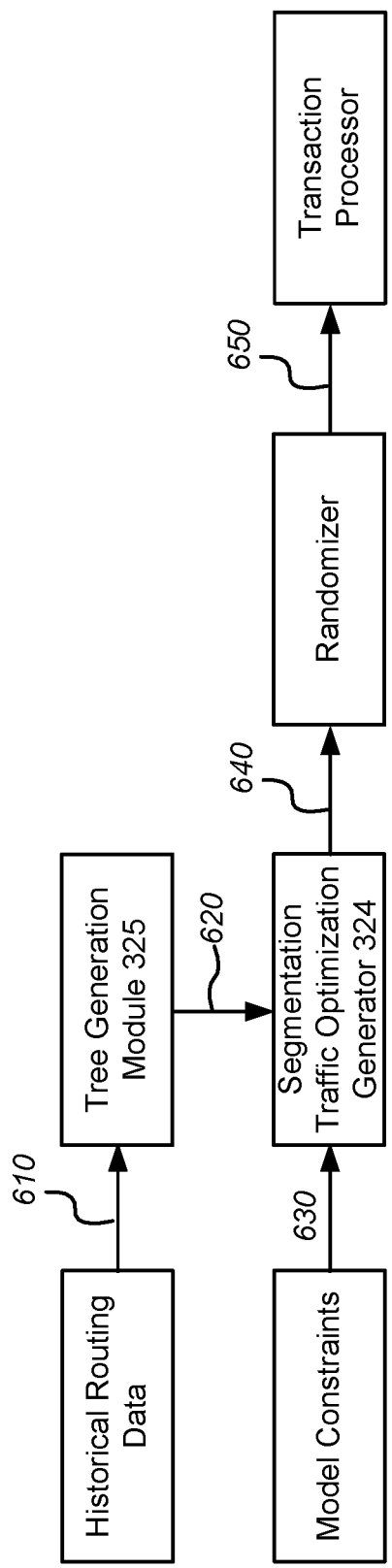
FIG. 6 illustrates one embodiment of a data flow for optimizing routing in view of model constraints, in accordance with some embodiments of the disclosure.

After tree structure 400 is generated, processor 202 of routing scheme generator 320 feeds tree structure into segmentation traffic optimization generator 324, which is executed to determine an optimal route for each transaction in view of other routing constraints that may prevent maximally optimal routing. FIG. 6 illustrates one embodiment of a data flow for optimizing routing in view of model constraints, in accordance with some embodiments of the disclosure. As depicted in data flow 600, historical routing data is fed 610 into tree generation module 325 to generate tree structure 400, as discussed above with reference to FIG. 3. Processor 202 then feeds 620 tree structure 400, and also feeds 630 model constraints from model constraint database 322, into segmentation traffic optimization generator 325. As used herein, the term model constraint refers to a constraint that processor 202 must accommodate when generating a routing scheme. For example, if tree structure 400 indicates that a first transaction processor 110 is optimal for processing a given transaction, but a model constraint indicates that a second transaction processor 110 must be used for a certain percentage of transactions having a particular attribute (e.g., 90%), then segmentation traffic optimization generator 325 may determine that the second transaction processor 110 must be used to process the given transaction 90% of the time, notwithstanding that it is suboptimal. Model constraints may be set by an administrator, by contractual agreements, and the like.

Upon determining optimal traffic distributions, segmentation traffic optimization generator 325 feeds 640 the optimal traffic distributions to a randomizer, which may be housed in routing processor 108, which pseudo-randomly selects between qualifying transaction processors 110, applying weights to the random selection based on the optimal traffic distributions. Routing processor 108 then transmits 650 the transaction to a transaction processor 110 as selected based on the randomizer.

The transactions that are processed through data flow 600 may each include a data structure with a plurality of fields of data, where each field of the plurality of fields of data corresponds to an attribute of attributes 410. The historical routing data was generated by tracking whether transactions including a field corresponding to the first attribute were attempted during a historical period. When receiving instructions to a routing processor to select a route for a given transaction of the transactions based on the ranking (e.g., as determined by segmentation traffic optimization generator 224), a routing processor may select the route based on the instructions by parsing each field of the plurality of fields of data in the given transaction, and analyzing each parsed field of the plurality of fields in an order specified by the ranking.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for optimizing routing decisions by way of a tree structure segmentation-based smart routing model through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method, the method comprising:
   retrieving, from a database, over a network, first historical routing data for a first attribute and second historical routing data for a second attribute;
   determining, based on the first historical routing data:
      whether a first processing volume for the first attribute exceeds a first volume threshold, the first processing volume for the first attribute being an amount of attempts to perform transactions having the first attribute, and
      whether a first processing error rate for the first attribute exceeds a first error threshold, the first processing error rate being a rate of failure of the attempts to perform transactions having the first attribute;
   in response to determining that both the first processing volume for the first attribute exceeds the first volume threshold, and the first processing error rate for the first attribute exceeds the first error threshold, calculating a first degree to which routing can be improved for the first attribute using alternate routing means;
   determining, based on the second historical routing data:
      whether a second processing volume for the second attribute exceeds a second volume threshold, the second processing volume for the second attribute being an amount of attempts to perform transactions having the second attribute, and
      whether a second processing error rate for the second attribute exceeds a second error threshold, the second processing error rate being a rate of failure of the attempts to perform transactions having the second attribute;
   in response to determining that both the second processing volume for the second attribute exceeds the second volume threshold, and the second processing error rate for the second attribute exceeds the second error threshold, calculating a second degree to which routing can be improved for the second attribute; and
   outputting a ranking for the first attribute and the second attribute based on respective values of the first degree and the second degree, wherein a router routes a transaction according to the ranking.

2. The computer-implemented method of claim 1, wherein the first historical routing data corresponds to a first transaction processor, and wherein calculating the first degree to which routing can be improved for the first attribute using alternate routing means comprises:
   determining a second transaction processor different from the first transaction processor that is configured to route data having the first attribute; and
   calculating the first degree based on third historical routing data corresponding to the second transaction processor.

3. The computer-implemented method of claim 1, wherein the first attribute and the second attribute are each selected from a group of candidate attributes comprising: a geographic area in which routing is attempted, whether a routing attempt is scheduled to recur, a token corresponding to the geographic area in which routing is attempted, an identifier of a transaction tool used to effect the routing attempt; a partially masked version of the identifier of the transaction tool, a type of the transaction tool, and a normalized amount of tokens used during the routing attempt.

4. The computer-implemented method of claim 1, further comprising:
   determining whether the first attribute comprises a plurality of sub-attributes;
   in response to determining that the first attribute comprises a plurality of sub-attributes, retrieving additional respective historical routing data for each respective sub-attribute of the plurality of sub-attributes; and
   determining a respective additional degree to which routing can be improved for each respective sub-attribute;
   wherein generating the ranking comprises including each respective sub-attribute in the ranking based on each respective additional degree.

5. The computer-implemented method of claim 1, wherein transactions comprise a plurality of fields of data, wherein each field of the plurality of fields of data corresponds to an attribute of a plurality of candidate attributes, and wherein the first historical routing data was generated by tracking whether transactions including a field corresponding to the first attribute were attempted during a historical period.

6. The computer-implemented method of claim 5, further comprising transmitting instructions to a routing processor to select a route for a given transaction of the transactions based on the ranking, wherein the routing processor selects the route based on the instructions by:
   parsing each field of the plurality of fields of data in the given transaction; and analyzing each parsed field of the plurality of fields in an order specified by the ranking.

7. The computer-implemented method of claim 1, wherein the ranking was generated at a given time, and wherein the method further comprises regenerating, after a predetermined amount of time from the given time, the ranking for the first attribute and the second attribute based on updated values of the first degree and the second degree.

8. The computer-implemented method of claim 1, wherein the first historical routing data and the second historical routing data correspond to a same transaction processor.

9. A method comprising:
receiving an instruction to route transactions according to a ranking, the ranking having been determined by:
retrieving, from a database, over a network, first historical routing data for a first attribute and second historical routing data for a second attribute;
determining, based on the first historical routing data:
whether a first processing volume for the first attribute exceeds a first volume threshold, the first processing volume for the first attribute being an amount of attempts to perform transactions having the first attribute, and
whether a first processing error rate for the first attribute exceeds a first error threshold, the first processing error rate being a rate of failure of the attempts to perform transactions having the first attribute;
in response to determining that both the first processing volume for the first attribute exceeds the first volume threshold, and the first processing error rate for the first attribute exceeds the first error threshold, calculating a first degree to which routing can be improved for the first attribute using alternate routing means;
determining, based on the second historical routing data:
whether a second processing volume for the second attribute exceeds a second volume threshold, the second processing volume for the second attribute being an amount of attempts to perform transactions having the second attribute, and
whether a second processing error rate for the second attribute exceeds a second error threshold, the second processing error rate being a rate of failure of the attempts to perform transactions having the second attribute;
in response to determining that both the second processing volume for the second attribute exceeds the second volume threshold, and the second processing error rate for the second attribute exceeds the second error threshold, calculating a second degree to which routing can be improved for the second attribute;
generating the ranking based on respective values of the first degree and the second degree; and
receiving a transaction; and
routing the transaction according to the ranking.

10. The method of claim 9, wherein routing the transaction according to the ranking further comprises:
ingesting the ranking, a first routing constraint corresponding to the first attribute, and a second routing constraint corresponding to the second attribute; and
determining an optimal transaction processor for the transaction based on the ingesting; and
transmitting the transaction using the optimal transaction processor.

11. A non-transitory computer readable medium configured to store instructions, the instructions when executed by a processor cause the processor to:
retrieve, from a database, over a network, first historical routing data for a first attribute and second historical routing data for a second attribute;
determine, based on the first historical routing data:
whether a first processing volume for the first attribute exceeds a first volume threshold, the first processing volume for the first attribute being an amount of attempts to perform transactions having the first attribute, and
whether a first processing error rate for the first attribute exceeds a first error threshold, the first processing error rate being a rate of failure of the attempts to perform transactions having the first attribute;
in response to determining that both the first processing volume for the first attribute exceeds the first volume threshold, and the first processing error rate for the first attribute exceeds the first error threshold, calculate a first degree to which routing can be improved for the first attribute using alternate routing means;
determine, based on the second historical routing data:
whether a second processing volume for the second attribute exceeds a second volume threshold, and
whether a second processing error rate for the second attribute exceeds a second error threshold, the second processing volume for the second attribute being an amount of attempts to perform transactions having the second attribute, the second processing error rate being a rate of failure of the attempts to perform transactions having the second attribute;
in response to determining that both the second processing volume for the second attribute exceeds the second volume threshold, and the second processing error rate for the second attribute exceeds the second error threshold, calculate a second degree to which routing can be improved for the second attribute; and
output a ranking for the first attribute and the second attribute based on respective values of the first degree and the second degree, wherein a router routes a transaction according to the ranking.

12. The computer readable medium of claim 11, wherein the first historical routing data corresponds to a first transaction processor, and wherein calculating the first degree to which routing can be improved for the first attribute using alternate routing means comprises:
determining a second transaction processor different from the first transaction processor that is configured to route data having the first attribute; and
calculating the first degree based on third historical routing data corresponding to the second transaction processor.

13. The computer readable medium of claim 11, wherein the first attribute and the second attribute are each selected from a group of candidate attributes comprising: a geographic area in which routing is attempted, whether a routing attempt is scheduled to recur, a token corresponding to the geographic area in which routing is attempted, an identifier of a transaction tool used to effect the routing attempt, a partially masked version of the identifier of the transaction tool, a type of the transaction tool, and a normalized amount of tokens used during the routing attempt.

14. The computer readable medium of claim 11, wherein the instructions further cause the processor to:
determine whether the first attribute comprises a plurality of sub-attributes;

in response to determining that the first attribute comprises a plurality of sub-attributes, retrieve additional respective historical routing data for each respective sub-attribute of the plurality of sub-attributes; and
determine a respective additional degree to which routing can be improved for each respective sub-attribute; wherein generating the ranking comprises including each respective sub-attribute in the ranking based on each respective additional degree.

15. The computer readable medium of claim 11, wherein transactions comprise a plurality of fields of data, wherein each field of the plurality of fields of data corresponds to an attribute of a plurality of candidate attributes, and wherein the first historical routing data was generated by tracking whether transactions including a field corresponding to the first attribute were attempted during a historical period.

16. The computer readable medium of claim 15, wherein the instructions further cause the processor to transmit instructions to a routing processor to select a route for a given transaction of the transactions based on the ranking, wherein the routing processor selects the route based on the instructions by:
   parsing each field of the plurality of fields of data in the given transaction; and
   analyzing each parsed field of the plurality of fields in an order specified by the ranking.

17. The computer readable medium of claim 11, wherein the ranking was generated at a given time, and wherein the instructions further cause the processor to regenerate, after a predetermined amount of time from the given time, the ranking for the first attribute and the second attribute based on updated values of the first degree and the second degree.

18. The computer readable medium of claim 11, wherein the first historical routing data and the second historical routing data correspond to a same transaction processor.

* * * * *